United States Patent Office 2,872,365
Patented Feb. 3, 1959

2,872,365

SELF-SUSTAINING ADHESIVE SHEET AND PROCESS FOR PRODUCING THE SAME AS WELL AS FOR UNITING SURFACES WITH IT

Norman Adrian de Bruyne, Duxford, Cambridge, George Saunders Newell, Cambridge, and Keith Richard Charles Perry, Sawston, Cambridge, England, assignors to Ciba Limited, Basel, Switzerland, a Swiss firm No Drawing. Application December 8, 1954
Serial No. 474,032

Claims priority, application Great Britain
December 10, 1953

6 Claims. (Cl. 154—79)

The present invention relates to a self-sustaining adhesive sheet and to a process for producing the same as well as for uniting surfaces with it.

In patent specification No. 2,499,134 there is described a process for uniting two surfaces, one at least of which is substantially non-porous (for example, a metal surface), which process comprises interposing between the two said surfaces a layer of polyvinyl acetal and between the polyvinyl acetal layer and each of the two surfaces to be united a layer of heat-hardenable resin, for example, phenol formaldehyde condensation product, and pressing the said surfaces and interposed material together at a temperature sufficient to harden the heat-hardenable resin.

In practising the process disclosed in the aforesaid specification, it has been found advantageous to employ the polyvinyl acetal in the form of a powder of controlled average particle size, this involving the coating of the joining surfaces with heat-hardenable resin, thereafter uniformly distributing the powdered polyvinyl acetal over each of the coated surfaces and finally, with the powder-coated surfaces in contact, pressing the assembly at a temperature sufficent to harden the heat-hardenable resin, the particles of powdered polymer coalescing together during the hot-pressing step. Said specification also describes the use of an adhesive film material consisting of a polyvinyl acetal film coated with a heat-hardenable phenol-formaldehyde condensation product in the uniting process.

According to the present invention, a self-sustaining adhesive sheet comprises a strippable support sheet carrying, in superposition thereon, in order (a) a layer of heat-hardenable resin composition, (b) a layer of particulate polyvinyl acetal, and (c) a layer of heat-hardenable resin composition, said layers (a), (b) and (c) being at least partially merged with one another. Whilst the adhesive sheets characteristic of the present invention are defined in terms of the layers which they contain, it is to be understood that the said layers may partially merge with one another so that the boundaries of the layers are indistinct in the product. Layers (a) and (c) may have the same composition and optionally a second strippable support sheet, which may be of the same material as the first, is superimposed on layer (c). Since the support sheets constitute the outer faces of the adhesive sheet they are hereinafter referred to as "facing sheets."

According to a further feature of the present invention a method for preparing the aforesaid self-sustaining adhesive sheet comprises applying separate films of liquid heat-hardenable resin to two facing sheets strippable from a film formed from said resin, distributing a coating of discrete particles of powdered polyvinyl acetal onto each of the film surfaces, placing the two coated surfaces face-to-face and applying pressure to secure adhesion between the two coated sheets. When the article thus obtained is required for use both facing sheets are removed.

To facilitate the rolling-up or unrolling of the adhesive sheet for despatch or use respectively, only one of the facing sheets is removed, the remaining facing sheet preventing adjacent layers of the rolled adhesive sheet from sticking together.

The facing sheet is preferably pliable and preferably has a waxlike or smooth, and therefore strippable, surface so that when pressure is applied to the facing sheets enclosing the resin-acetal composition the resultant interposed film does not to any substantial extent adhere to the facing sheet. A particularly suitable material for use as the facing sheet is polyethylene.

The polyvinyl acetal resin is preferably polyvinyl formal having a particle size passing a 0.500 mm. mesh sieve and resting on a 0.295 mm. mesh sieve. However, other polyvinyl acetals, such as polyvinyl acetal itself or polyvinyl butyral, may be employed with similar result.

While any heat-hardenable resin, such as phenol-formaldehyde resins, melamine-formaldehyde resins, carbamide-formaldehyde resins or ethoxyline resins, may be used the heat-hardenable phenol-formaldehyde resins (including the cresol-formaldehyde and similar resins) are generally preferred. The resins layers may also contain a proportion of the acetal just mentioned.

According to a further embodiment of this invention the self-sustaining adhesive sheet includes, embodied in one or more of the layers, or located between the layers and a facing sheet but secured to the layers, a layer of textile material e. g. woven or knitted natural or synthetic textile material such as cotton, wool, silk, viscose, nylon and glass yarns. Conveniently the textile material is in the form of a loose mesh fabric.

According to a still further feature of the present invention a process for uniting two surfaces by interposing between those surfaces an adhesive, and thereafter pressing the said surfaces and interposed adhesive together at elevated temperature, is characterized in that the adhesive consists of a self-sustaining adhesive sheet as described above but from which the facing sheets have been stripped away.

Adhesive sheets containing textile reinforcements, as described above, are of particular value in the application of a metal skin to a honeycomb core, where the core presents only a relatively small and discontinuous surface to which the skin can be adhered, as the reinforcement keeps the adhesive layer pressed uniformly on to the metal skin. In its absence the adhesive layer bulges out into each honeycomb cell.

It is normally unnecessary to treat the metal and other surfaces (apart from cleaning or etching them) before effecting adhesion with the adhesive sheets of the present invention but in some cases, e. g. in attaching skins to honeycomb cores, the application of a primer coat to the honeycomb core for instance of a liquid heat-hardenable resin, is advantageous.

The following examples illustrate the preparation of sheets according to the present invention and the application of such sheets for uniting two metal surfaces.

*Example I*

A liquid phenol-formaldehyde resin is obtained by reacting 85 parts by weight of carbolic acid (80% phenol) and 85 parts by volume of formalin (40% formaldehyde) in the presence of 0.5 part by weight of sodium hydroxide for about 30 minutes until the aqueous resin solution arrives at the point at which it would separate into two phases if diluted with more than its own volume of water. This resin is coated on to one side of a polyethylene facing sheet and immediately afterwards, before the applied film spontaneously breaks up into droplets, powdered polyvinyl formal is sprinkled on to the layer. The powder is formulated of one part by weight of powder passing a 0.853 mm. mesh sieve but not a 0.500 mm. mesh sieve and two-and-a-half parts by weight of powder passing a 0.500 mm. mesh sieve but not a 0.295 mm. mesh sieve. The powder is conveniently applied from a vibratory feeder of which the amplitude of vibration can be controlled and the distribution adjusted so that the ratio of liquid resin to powdered polyvinyl formal is at about 4 parts by weight of the former to 5 parts by weight of the latter. The quantity of the resin and powder applied should be such as to provide a coating weighing about 61 grams per square meter of facing sheet.

A similar procedure is carried out on a second facing sheet of polyethylene and the two coated surfaces are then placed in contact and pressed at about 35.2 kg./cm.$^2$ for one minute at room temperature. After the pressing operation, the two facing sheets can be peeled off each side of the film thus formed between them, or alternatively one only of such sheets is removed, the remaining sheet serving to prevent sticking of the film when rolled up for despatch. If preferred both polyethylene sheets can be left in place until the adhesive film is required for use.

The film thus prepared, separated from the backing sheets, is inserted between two cleaned metal surfaces and the metal surfaces are pressed together at 3.5 to 7.0 kg./cm.$^2$ at 145° C. for 20 minutes. A very strong adhesion is obtained.

*Example II*

The procedure of Example I was followed using, instead of the phenol-formaldehyde resin, a melamine-formaldehyde resin solution made by dissolving 100 parts by weight of melamine-formaldehyde powder in 40 parts by weight of water. The ratio of melamine to formaldehyde in the powder was 2.60:1.

The adhesion was tested by using test strips of aluminium 25.4 mm. wide and 0.91 mm. thick with an overlap of 12.7 mm. and pulling the joints apart in a tensile testing machine. The average failing load of six tests at room temperature was 304 kg.

*Example III*

The procedure of Example I was followed using a liquid urea-formaldehyde resin, the ratio of urea to formaldehyde in the resin being 1.88:1. Similarly tested, the average failing load of six tests was 408 kg.

*Example IV*

The procedure of Example I was followed using an alcohol solution of a resin derived from 1 part by weight of dihydroxydiphenylpropane and 2 parts by weight of formaldehyde, by refluxing them together at a pH of 8.5. Similarly tested, the average failing load of six tests was 950 kg.

*Example V*

The procedure of Example I was followed using a resin made by reacting 1 mol of cresol with 1.45 mol of formaldehyde and 1/100 mol of caustic soda. The reaction was continued until the mixture became cloudy on cooling to 20° C. The resin was dissolved in alcohol. Similarly tested, the average failing load of six tests was 860 kg.

*Example VI*

The procedure of Example I was followed using a resorcinol phenol formaldehyde resin having a molecular ratio of 0.67 resorcinol, 0.47 phenol and 1.0 formaldehyde. Similarly tested, the average failing load of six tests was 304 kg.

*Example VII*

The procedure of Example I was followed using an epoxy resin made by reacting 4:4'-dihydroxy diphenyl propane with epichlorhydrin in the presence of an excess of sodium hydroxide, the product having an epoxy content of 2.3 equivalents per kilogram. 100 parts by weight of this resin and 5 parts by weight of dicyandiamide were dissolved in 65 parts by weight of 2-methoxy ethanol. In this case the test specimens were pressed together at 145° C. and 7.0 kg./cm.$^2$ for 7 hours. The average failing load of six tests was 635 kg.

*Example VIII*

The procedure of Example I was followed, using the same phenolic resin but using a polyvinyl butyral instead of polyvinyl formal. The average failing load of six tests was 770 kg.

What is claimed is:

1. A process for producing a self-sustaining adhesive sheet which comprises applying a liquid heat-hardenable resin to two strippable facing sheets to form separate layers of said resin on said sheets, distributing discrete particles of a polyvinyl acetal on the surfaces of each of the resin layers to form a coating thereon of polyvinyl acetal particles, placing the two coated surfaces with their polyvinyl acetal coatings face to face and applying pressure thereto to form a single coherent adhesive sheet wherein the polyvinyl acetal particles are at least partially merged with and also coat the layers of the heat-hardenable resin, said formed adhesive sheet being capable of subsequent removal from the facing sheets as a self-sustaining adhesive sheet ready for use to unite surfaces by placing said sheet between the surfaces and applying heat and pressure.

2. A process in accordance with claim 1, wherein a layer of textile material is interposed between the two coated surfaces before they are placed face to face.

3. A process in accordance with claim 1, wherein the facing sheets are of polyethylene.

4. A process in accordance with claim 1, wherein the heat-hardenable resin is a phenol-formaldehyde resin, and the polyvinyl acetal is polyvinyl formal.

5. An adhesive in the form of a self-sustaining coherent sheet, said sheet being useful for uniting surfaces by placing said sheet between the surfaces and applying heat and pressure, said sheet comprising two outer layers of a heat-hardenable resin and two inner layers of discrete polyvinyl acetal particles, said sheet being produced by the process of claim 1.

6. An adhesive in accordance with claim 5, wherein the heat-hardenable resin is a phenol-formaldehyde resin, and the polyvinyl acetal is polyvinyl formal.

References Cited in the file of this patent

UNITED STATES PATENTS

| | | |
|---|---|---|
| 1,777,309 | Hopkinson | Oct. 7, 1930 |
| 2,381,495 | Hall | Aug. 7, 1945 |
| 2,414,474 | March | Jan. 21, 1947 |
| 2,499,134 | De Bruyne | Feb. 28, 1950 |
| 2,499,724 | Compton | Mar. 7, 1950 |
| 2,541,498 | Calvert | Feb. 13, 1951 |
| 2,599,359 | Banks | June 3, 1952 |
| 2,607,709 | Simpson et al. | Aug. 19, 1952 |
| 2,662,044 | Morrison et al. | Dec. 8, 1953 |
| 2,667,436 | Goepfert et al. | Jan. 26, 1954 |
| 2,687,976 | Gerke | Aug. 31, 1954 |
| 2,694,028 | Rapp | Nov. 9, 1954 |

FOREIGN PATENTS

| | | |
|---|---|---|
| 556,813 | Great Britain | Oct. 22, 1943 |
| 577,823 | Great Britain | June 3, 1946 |